J. S. HETTINGER.
PACKING.
APPLICATION FILED SEPT. 30, 1913.

1,100,182.

Patented June 16, 1914.

Witnesses

Inventor
Jennie S. Hettinger,
By Joshua R. H. Potts.
Attorney

UNITED STATES PATENT OFFICE.

JENNIE S. HETTINGER, OF CAMDEN, NEW JERSEY.

PACKING.

1,100,182.  Specification of Letters Patent.  Patented June 16, 1914.

Application filed September 30, 1913. Serial No. 792,553.

*To all whom it may concern:*

Be it known that I, JENNIE S. HETTINGER, a citizen of the United States, residing at Camden, in the county of Camden and State of New Jersey, have invented certain new and useful Improvements in Packings, of which the following is a specification.

My invention relates to improvements in packing, and more particularly to an improved gasket, the object of the invention being to provide a packing or gasket comprising a spirally wound interlocking metal strip firmly holding the convolutions together, yet permitting an elasticity of the gasket when pressure is applied thereon.

A further object is to provide a gasket having an improved construction of interlocking metal strip with the several sections of said strip curved transversely permitting of elasticity to compensate for expansion and contraction, and insure a tight packing under any and all conditions.

With these and other objects in view, the invention consists in certain novel features of construction and combinations and arrangements of parts as will be more fully hereinafter described and pointed out in the claims.

Figure 1:
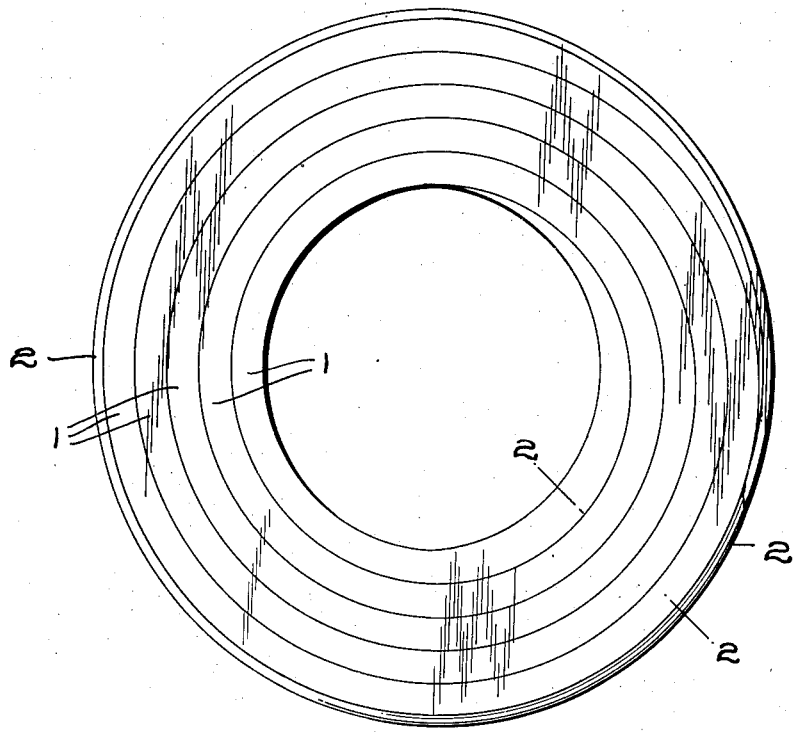
Figure 2:
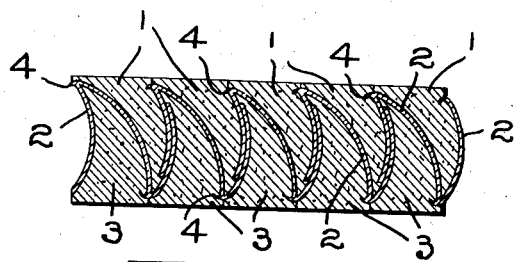
Figure 3:
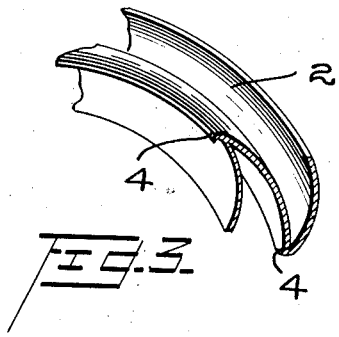

In the accompanying drawings: Figure 1 is a plan view illustrating my improvements. Fig. 2 is a view in cross section on the line 2—2 of Fig. 1, and Fig. 3 is a fragmentary perspective view of my improved metal strip.

My improved gasket or packing consists of three continuous members 1, 2, and 3. The members 1 and 3 are strips of asbestos or other suitable non-metallic material, and are positioned at opposite sides of the member 2 which is a strip of metal and of the shape shown most clearly in Figs. 2 and 3.

The strip 2 is of general N-shape in cross section with all three sections thereof curved transversely. As these members are wound spirally, the metal strips 2 interlock as shown most clearly in Fig. 2, and due to the shape of this metal strip 2, the members 1 and 3 are firmly held between the same when the gasket is pressed together. The metal strip 2 at its angles is formed with sharp projecting flanges 4 which embed themselves in the members 1 and 3 and firmly hold the material together. It will be observed that the portions of said strip where they overlap or interlock, are not provided with these flanges, but in other places said strip is provided with such flanges, both at the angles and at the edges. In other words, wherever possible, these locking flanges are provided, so as to grip the fibrous material of the members 1 and 3, and prevent any possibility of the convolutions separating.

It will be noted that the combined thickness of the members is greater than the depth of the metal strip, so that the metal strip is entirely hid or covered, and is not seen at either upper or lower surface of the gasket, but only at the inner and outer edges. Furthermore, it will be observed that the metal strip is so positioned that pressure upon the gasket will tend to curve all portions of the strip, and hence the elasticity of the metal strip is utilized to the maximum extent.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. As a new article of manufacture, a packing embodying in its construction a spirally wound interlocking metal strip of general N-shape in cross section, substantially as described.

2. A packing comprising a continuous metal strip with non-metallic strips at opposite sides thereof, said metal strips interlocking and of a width less than the thickness of the packing, substantially as described.

3. A packing comprising a metal strip of general N-shape in cross section with fibrous strips at opposite sides thereof, and the convolutions of said metal strip interlocking, substantially as described.

4. A packing composed of a spirally wound metal strip of general N-shape in cross section, the convolutions of said strip interlocking, and non-metallic material at both sides of said strip, substantially as described.

5. A packing composed of a spirally wound metal strip of general N-shape in cross section, the convolutions of said strip interlocking, non-metallic material at both sides of said strip, and said strip having its members curved transversely, substantially as described.

6. A packing composed of a spirally wound metal strip of general N-shape in cross section, the convolutions of said strip interlocking, non-metallic material at both sides of said strip, and said strip having flanges at its angles embedded in the non-metallic material, substantially as described.

7. A packing comprising a ring composed of three spirally wound strips, the intermediate strip composed of metal of general N-shape with the convolutions of said strip interlocking, substantially as described.

8. A packing comprising a ring composed of three spirally wound strips, the intermediate strip composed of metal of general N-shape with the convolutions of said strip interlocking, and flanges at the angles of the metal strip embedded in the non-metallic material at both sides of the strip, substantially as described.

9. A packing composed of an embedded spirally wound metal strip, each convolution of the strip interlocked with the convolutions of the strip adjacent thereto, substantially as described.

In testimony whereof I have signed my name to this specification in the presence of two subscribing witnesses.

JENNIE S. HETTINGER.

Witnesses:
 BENJ. W. GRAVENOR,
 LILLIE C. COUNSELLAR.